(12) United States Patent
Tanoguchi et al.

(10) Patent No.: US 11,532,311 B2
(45) Date of Patent: Dec. 20, 2022

(54) SYSTEM, METHOD, PROGRAM, AND RECORDING MEDIUM FOR IMPROVING ACCURACY OF CALL DATA ANALYSIS

(71) Applicant: YOKOGAWA ELECTRIC CORPORATION, Tokyo (JP)

(72) Inventors: Hiroshi Tanoguchi, Tokyo (JP); Junko Yamashita, Tokyo (JP); Keita Miyamoto, Tokyo (JP); Dan Hu, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/117,156

(22) Filed: Dec. 10, 2020

(65) Prior Publication Data
US 2021/0098000 A1    Apr. 1, 2021

Related U.S. Application Data

(63) Continuation of application No. PCT/JP2019/037753, filed on Sep. 26, 2019.

(30) Foreign Application Priority Data

Sep. 27, 2018 (JP) .............................. JP2018-182516

(51) Int. Cl.
*H04M 3/51*    (2006.01)
*G10L 15/30*    (2013.01)
(Continued)

(52) U.S. Cl.
CPC ............ *G10L 15/30* (2013.01); *G06F 16/383* (2019.01); *G06F 40/279* (2020.01);
(Continued)

(58) Field of Classification Search
None
See application file for complete search history.

(56) References Cited

U.S. PATENT DOCUMENTS 8,649,499 B1    2/2014    Koster
8,825,478 B2 *  9/2014    Cox ........................ G10L 15/26
                                                    704/235
(Continued)

FOREIGN PATENT DOCUMENTS

JP    2016192714 A    11/2016

OTHER PUBLICATIONS

International Search Report and (ISA/237) Written Opinion of the International Search Authority for International Patent Application No. PCT/JP2019/037753, dated Dec. 11, 2019.

*Primary Examiner* — Nafiz E Hoque

(57) ABSTRACT

Recently, there has been a demand for further improvement of accuracy of analysis. A system is provided that includes an acquisition unit that acquires call data which is a record of a call between a client and a contact center, a sound recognition unit that performs sound recognition on the call data by using a keyword registered in dictionary data, an analysis unit that performs analysis using a keyword included in a result of the sound recognition, and a registration unit that registers in the dictionary data, a keyword included in a product information database among a plurality of the keywords included in the result of the sound recognition, the product information database storing product information about each of a plurality of products.

7 Claims, 4 Drawing Sheets

(51) Int. Cl.
  *G06F 16/383* (2019.01)
  *G06F 40/279* (2020.01)
  *G06Q 10/08* (2012.01)
  *G06Q 10/10* (2012.01)
  *G06Q 30/00* (2012.01)
  *G06Q 30/02* (2012.01)
  *G06Q 50/18* (2012.01)
  *G10L 15/26* (2006.01)
  *G06Q 10/00* (2012.01)

(52) U.S. Cl.
  CPC ........... *G06Q 10/087* (2013.01); *G06Q 10/10* (2013.01); *G06Q 30/016* (2013.01); *G06Q 30/0203* (2013.01); *G06Q 50/18* (2013.01); *G10L 15/26* (2013.01); *H04M 3/5183* (2013.01); *G06Q 10/20* (2013.01)

(56) References Cited

U.S. PATENT DOCUMENTS

| | | | |
|---|---|---|---|
| 11,030,277 B1* | 6/2021 | Meltabarger | G16H 10/60 |
| 2004/0249636 A1* | 12/2004 | Applebaum | G10L 15/1822 |
| | | | 704/231 |
| 2005/0283475 A1 | 12/2005 | Beranek | |
| 2009/0234832 A1* | 9/2009 | Gao | G06F 16/3322 |
| | | | 707/999.005 |
| 2011/0022433 A1* | 1/2011 | Nielsen | G06Q 10/06 |
| 2016/0292204 A1* | 10/2016 | Klemm | G06F 16/3329 |
| 2016/0350699 A1 | 12/2016 | Vymenets | |
| 2017/0269899 A1* | 9/2017 | Spiessbach | G10L 15/08 |

\* cited by examiner

SYSTEM, METHOD, PROGRAM, AND RECORDING MEDIUM FOR IMPROVING ACCURACY OF CALL DATA ANALYSIS

CROSS REFERENCE TO RELATED APPLICATION

This is a continuation application of International Application No. PCT/JP2019/037753 filed on Sep. 26, 2019, which claims priority to Japanese Patent Application No. 2018-182516 filed on Sep. 27, 2018, the contents of each of which are incorporated herein by reference in their entirety.

BACKGROUND

1. Technical Field

The present invention relates to a system, a method, a program, and a recording medium.

2. Related Art

A conventionally proposed technique provides services with a content of a call with a client analyzed by using a Computer Telephony Integration (CTI) system (for example, Patent Document 1).

Patent Document 1: Japanese Patent Application Publication No. 2016-192714

SUMMARY

Yet, there has recently been a demand for higher accuracy of the analysis.

To achieve the task described above, a first aspect of the present invention provides a system. The system may include an acquisition unit that acquires call data which is a record of a call between a client and a contact center. The system may include a sound recognition unit that performs sound recognition on the call data by using a keyword registered in dictionary data. The system may include an analysis unit that performs analysis using a keyword included in a result of the sound recognition. The system may include a registration unit that registers in the dictionary data, a keyword included in a product information database among a plurality of the keywords included in the result of the sound recognition, the product information database storing product information about each of a plurality of products.

A second aspect of the present invention provides a method. The method may include acquiring call data about a call which is a record of a call between a client and a contact center. The method may include performing sound recognition on the call data by using a keyword registered in dictionary data. The method may include performing analysis using a keyword included in a result of the sound recognition. The method may include registering in the dictionary data, a keyword included in a product information database among a plurality of the keywords included in the result of the sound recognition, the product information database storing product information about each of a plurality of products.

A third aspect of the present invention provides a computer-readable medium having a program recorded thereon. The program may cause a computer to function as an acquisition unit that acquires call data which is a record of a call between a client and a contact center. The program may cause a computer to function as a sound recognition unit that performs sound recognition on the call data by using a keyword registered in dictionary data. The program may cause a computer to function as an analysis unit that performs analysis using a keyword included in a result of the sound recognition. The program may cause a computer to function as a registration unit that registers in the dictionary data, a keyword included in a product information database among a plurality of the keywords included in the result of the sound recognition, the product information database storing product information about each of a plurality of products.

DETAILED DESCRIPTION OF EMBODIMENTS

The present invention is described below based on an embodiment of the invention. The embodiment described below does not limit the invention according to the scope of the claims. Not all combinations of features described in the embodiment are essential for the solution of the invention.

<1. System 1>

Figure 1:
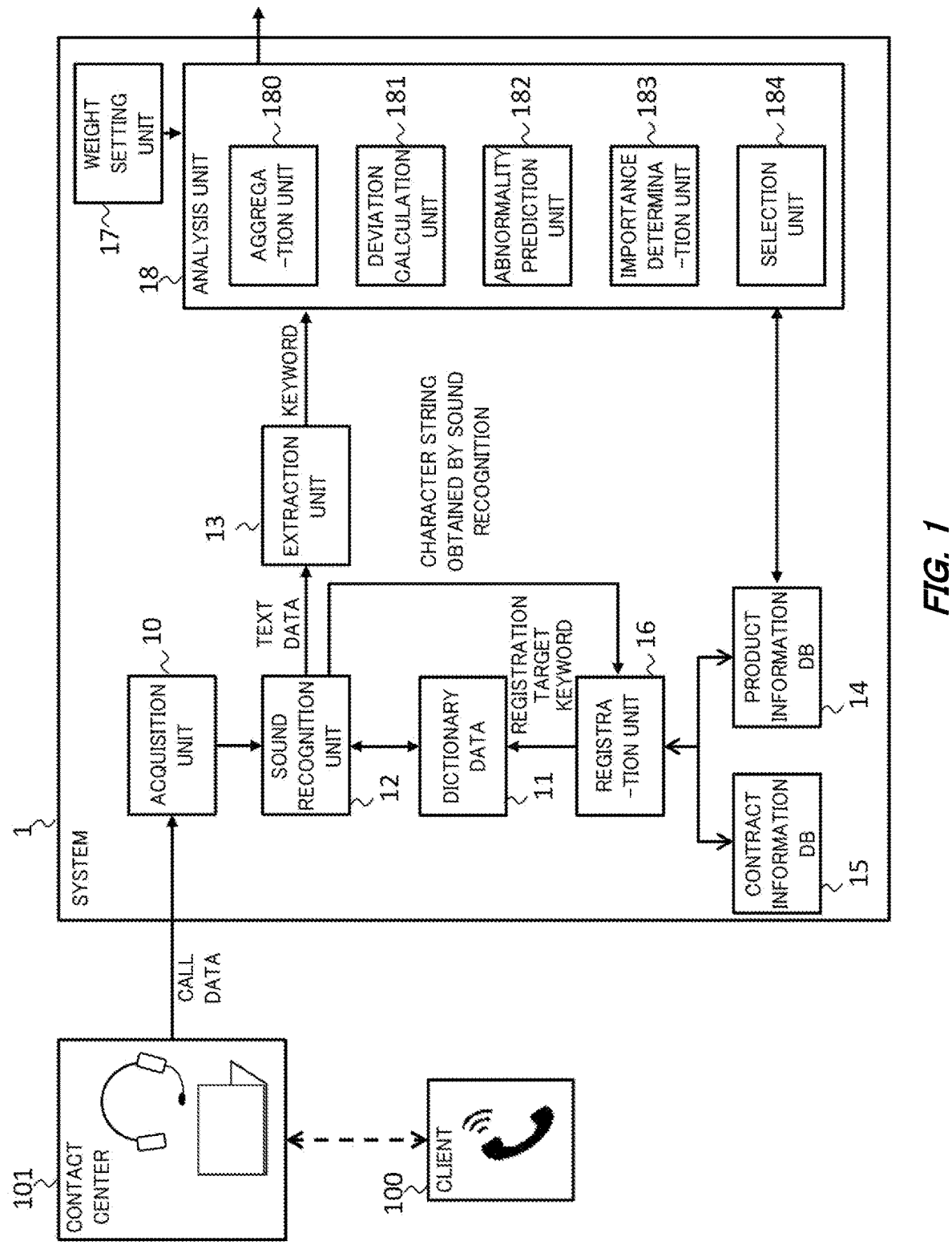
FIG. 1 illustrates a system 1 according to the present embodiment together with a client 100 and a contact center 101.

FIG. 1 illustrates a system 1 according to the present embodiment together with a client 100 and a contact center 101. The client 100 and the contact center 101 make a call related to one or a plurality of products and services (hereinafter, also simply referred to as a product). The system 1 assists the support for the client 100, and includes an acquisition unit 10, dictionary data 11, a sound recognition unit 12, an extraction unit 13, a product information database 14, a contract information database 15, a registration unit 16, a weight setting unit 17, and an analysis unit 18. For example, the system 1 may be a cloud computing system, or may be a server computing system implemented with one or a plurality of server computers or the like.

<1-1. Acquisition Unit 10>

The acquisition unit 10 acquires call data that is a record of a call between the client 100 and the contact center 101. For example, the acquisition unit 10 may acquire the call data from the contact center 101. The contact center 101 may be a Computer Telephony Integration (CTI) system. The acquisition unit 10 supplies the acquired call data to the sound recognition unit 12.

<1-2. Dictionary Data 11>

In the dictionary data 11, a plurality of keywords related to a product are registered. The keywords are words that may occur in the call between the client 100 and the contact center 101, and may be a clue for recognizing the content of the call between the client 100 and the contact center 101, for example. Examples of the keyword include identification information about the client 100 (such as the name, the phone number, or a contract number of the client 100, for example), identification information about a product (such as the name and serial number of the product, for example), usage options of a product (such as a setting content, use environment, used region, used location, and use cycle, for example), and abnormality information (such as an abnormality content and an error code, for example).

The keywords in the dictionary data 11 may at least partially be registered by any one of the client 100 and users (a manufacturer providing the product, an operating company of the contact center 101, and an operating company of the system 1, for example) of the system 1 in advance. The keywords in the dictionary data 11 may be at least partially registered by the registration unit 16 described later.

<1-3. Sound Recognition Unit 12>

The sound recognition unit 12 performs sound recognition on the call data by using the keywords registered in the dictionary data 11. For example, the sound recognition unit 12 performs sound recognition on call data, and generates text data including the keywords registered in the dictionary data. The sound recognition unit 12 supplies the text data to the extraction unit 13. Furthermore, the sound recognition unit 12 supplies a character string, obtained by the sound recognition, to the registration unit 16. The keywords registered in the dictionary data 11 is not necessarily used in the character string supplied to the registration unit 16.

<1-4. Extraction Unit 13>

The extraction unit 13 extracts one or a plurality of keywords from the text data included in the result of the sound recognition. For example, the extraction unit 13 executes natural language processing on the text data supplied from the sound recognition unit 12, to detect a plurality of keywords in the text data. The extraction unit 13 extracts from these plurality of keywords detected, a keyword that often occurs, or a plurality of keywords that are highly correlated with each other (a plurality of keywords in co-occurrence relationship). The extraction unit 13 may detect a general keyword from the text data, or may detect a special keyword such as company jargon and technical terms, and use a general keyword corresponding to the special keyword as the detected keyword. The general keyword corresponding to the special keyword may be a keyword obtained by converting the special keyword into a synonym, a hypernym, or a hyponym.

The extraction unit 13 may detect a feeling from a client during the call, from words included in the text data. The extraction unit 13 supplies each extracted keyword to the analysis unit 18. The extraction unit 13 also supplies the extracted keyword to the registration unit 16. For example, the extraction unit 13 supplies each of extracted keywords, excluding the registered keyword, to the registration unit 16.

<1-5. Product Information Database 14>

The product information database 14 stores product information about each of a plurality of products. The product information may include a plurality of sets questions and answers related to the products, in addition to the identification information about the products described above. Each set of question and answer may be associated with a combination of a plurality of keywords that may be included in the question and the answer.

<1-6. Contract Information Database 15>

The contract information database 15 stores information about a service contract signed with each client 100. The information about the service contract may include contract information about the client 100, information about product delivery to the client 100, and history information about the client 100, in addition to the identification information about the product and the identification information about the client 100 that are described above. The contract information about the client 100 may be information about a contract, related to support or maintenance, signed between the client 100 and a manufacture providing the product, an operating company of the contact center 101, an operating company of the system 1, or the like. The history information about the client 100 may include a history of calls between the client 100 and the contact center 101, a history of maintenance for a product purchased by the client 100, a history of services provided (a report on each service provided), and the like.

<1-7. Registration Unit 16>

The registration unit 16 registers in the dictionary data 11, a keyword included in the product information database 14 among a plurality of keywords included in a result of the sound recognition. Furthermore, the registration unit 16 may register in the dictionary data 11, a keyword included in the contract information database 15 among a plurality of keywords included in a result of the sound recognition. For example, a character string in call data obtained by the sound recognition performed by the sound recognition unit 12 may include a plurality of keywords other than the keyword registered in the dictionary data 11. The registration unit 16 extracts a keyword included in the product information database 14 or the contract information database 15 among such a plurality of keywords, and additionally registers the extracted keyword in the dictionary data 11. When character strings obtained by the sound recognition include a character string obtained by sound recognition with low reliability or a frequently occurring character string, the registration unit 16 may include such character strings and keywords predicted from the character strings, in the result of the sound recognition. The registration unit 16 may predict a keyword from a character string, by using artificial intelligence (AI) or by searching the product information database 14 or the contract information database 15 for a keyword with a configuration similar to that of the character string.

Under a condition that a keyword that has occurred in a plurality of the calls between one or a plurality of clients 100 and the contact center 101 at a frequency (twice a day, for example) or a number of times (three times, for example) that is equal to, or higher or larger than a criterion is included in the product information database 14 or the contract information database 15, the registration unit 16 may register the keyword in the dictionary data 11. Thus, the keywords are prevented from being excessively registered in the dictionary data 11. Alternatively, under a condition that a keyword that has occurred once in a call is included in the product information database 14 or the contract information database 15, the registration unit 16 may register the keyword in the dictionary data 11.

<1-8. Weight Setting Unit 17>

The weight setting unit 17 sets a weight to a keyword registered in the dictionary data 11, in accordance with an input from the user of the system 1. A weight of a negative keyword regarding a product (large operating sound for example) may be set to be larger than a weight of a positive keyword (small operating sound for example). A weight of a keyword related to an abnormal state may be set to be larger than a weight of a keyword related to a normal state. The keyword related to the abnormal state may be weighted based on a risk level. For example, a weight of a keyword (smells burnt or smells weird for example) that may lead to a serious accident may be set to be larger than a weight of a keyword (a lamp is lit for example) related to a minor failure. When the extraction unit 13 detects a feeling from the client 100, the weight setting unit 17 may set a weight of a case where a feeling such as anger and grief is detected to be larger than the weight of a case where other feelings are detected. In such a case, the weight setting unit 17 may set the weight regardless of what is input by the user.

<1-9. Analysis Unit 18>

The analysis unit 18 performs analysis by using a keyword included in a result of the sound recognition. In the present embodiment, for example, the analysis unit 18 performs analysis by using a keyword extracted by the extraction unit 13. The analysis unit 18 includes an aggregation unit 180, a deviation calculation unit 181, an abnormality prediction unit 182, an importance determination unit 183, and a selection unit 184. Note that the analysis unit 18 may not include at least one of these.

<1-9(1). Aggregation Unit 180>

The aggregation unit 180 aggregates combinations of keywords. For example, the aggregation unit 180 aggregates and stores combinations of a plurality of keywords extracted from the past call data. For example, each time the acquisition unit 10 acquires call data, the aggregation unit 180 aggregates and stores a combination of a plurality of keywords, extracted from the call data. A combination of keywords extracted from call data is in co-occurrence relationship in the call data. A combination of keywords extracted from call data may include all the keywords extracted from the call data, or may include only a part of the keywords.

For example, a combination of keywords extracted from call data may include any combination of one or a plurality of predetermined keywords that may be extracted. For example, when M keywords are extracted (with M being an integer that is equal to or larger than 2), a combination of keywords may include any combination of two selected ones of the M keywords, or may include any combination of two, . . . or M selected ones of the M keywords.

Alternatively, a combination of keywords extracted from call data may include any combination of one or a plurality of keywords that may be extracted from call data about a single sentence (or call data within a time window having a reference time length). For example, when N keywords (with N being an integer that is equal to or larger than two) are extracted from call data about a single sentence, a combination of keywords may include any combination of two selected ones of the N keywords, or may include any combination of two, . . . or N selected ones of the N keywords.

Furthermore, a combination of keywords extracted from call data may be a combination of one or a plurality of consecutive keywords that may be extracted from call data.

The aggregation unit 180 may store a combination of keywords in association with identification information about the call data (information about the date and time of a call for example). The aggregation unit 180 may aggregate a combination of keywords for each type of product abnormality, or for each type of keyword included in the combination. The type of product abnormality may be set for each call data by the user or the like. For example, the type of product abnormality may be identified through a call between the client 100 and the contact center 101, and may be set during or after the call. When a keyword extracted from call data includes abnormality information about a product (such as the content of the abnormality or an error code for example), the abnormality information may be used as the type of product abnormality.

The aggregation unit 180 may output a combination of keywords extracted from the latest call data and an aggregation result, as an analysis result of the call. For example, the aggregation unit 180 may add a combination of keywords in the latest call to a past aggregation result, and output the resultant of the addition as an analysis result.

<1-9(2). Deviation Calculation Unit 181>

The deviation calculation unit 181 calculates a deviation of a combination of a plurality of keywords extracted from call data about the latest call, based on a result of comparison between the combination of the keywords in the latest call and combinations of a plurality of keywords stored in the aggregation unit 180. For example, the deviation calculation unit 181 may search the combinations stored in the aggregation unit 180 for the combination of keywords extracted from call data about the latest call, and calculate the deviation to be lower for a larger number of hits. The deviation calculation unit 181 may output the calculated deviation, as a result of analysis on the call.

<1-9(3). Abnormality Prediction Unit 182>

The abnormality prediction unit 182 predicts the type of product abnormality in the latest call by using a result of comparison between a combination of a plurality of keywords extracted from call data about the latest call, and a combination of a plurality of keywords aggregated for each product abnormality type by the aggregation unit 180. For example, the abnormality prediction unit 182 detects one or a plurality of combinations with a high matching rate with a combination of keywords extracted from latest call data, among combinations of keywords for each product abnormality type aggregated by the aggregation unit 180. Then, the abnormality prediction unit 182 predicts, as an abnormality type in the latest call, the product abnormality type corresponding to the combination with the largest number of aggregations among the detection combinations. The abnormality prediction unit 182 may output the predicted abnormality type, as a call analysis result.

<1-9(4). Importance Determination Unit 183>

The importance determination unit 183 determines the importance of the latest call by using a weight set to each of a plurality of keywords extracted from call data about the latest call. For example, the importance determination unit 183 may set the importance of the latest call to be the sum of the weights of the extracted keywords. The importance determination unit 183 may set the importance of the latest call to be a sum of weights larger than a reference value among the weights of the extracted keywords. In this case, the importance of a call can be prevented from being high due to the call being long to involve repetitive occurrences of keywords with small weights. The weight of a keyword may be set in advance by the weight setting unit 17 before the call. The importance determination unit 183 may output the determined importance as a call analysis result.

<1-9(5). Selection Unit 184>

The selection unit 184 selects questions and answers according to a plurality of keywords extracted from the latest call, from a plurality of sets of questions and answers stored in the product information database 14. For example, the selection unit 184 detects one or a plurality of combinations with a high matching rate with the combination of keywords extracted from the current call data, among combinations of keywords each associated with a corresponding one of the sets of questions and answers in the product information database 14, and selects a set of question and answer according to the detected combination. The selection unit 184 may output the selected set of question and answer as a call analysis result.

According to the system 1 described above, the analysis is performed by using a keyword included in a result of sound recognition on call data about a call between the client 100 and the contact center 101, whereby collectible implementation from call to analysis is possible. When a keyword included in the product information database 14 among a plurality of keywords included in a result of the sound recognition (for example, a character string obtained by sound recognition with low reliability, and keywords predicted from the character string) is not registered in the dictionary data 11, the keyword is additionally registered. Thus, with the keyword that is included in the product information database 14 but is not registered in the dictionary data 11 additionally registered in the dictionary data 11, the accuracy of the analysis can be improved. When a keyword, among a plurality of keywords included in a result of sound recognition, is included in the contract information database 15 but is not registered in the dictionary data 11, the keyword is additionally registered. Thus, with the keyword that is included in the contract information database 15 but is not registered in the dictionary data 11 additionally registered in the dictionary data 11, the accuracy of the analysis can further be improved.

A deviation of a combination of latest keywords is calculated through comparison between a combination of keywords extracted from the latest call and a combination of keywords aggregated from a plurality of past calls. Thus, occurrence of a deviated combination of keywords in a call can be detected. Thus, a new product abnormality can be detected and a countermeasure can be drafted quickly.

The product abnormality type related to the latest call is predicted by using a result of comparison between the combination of keywords extracted from the latest call and the combination of keywords aggregated for each product abnormality type, and thus can be accurately predicted. When a combination of new keywords is extracted from the latest call, a new product type can be detected and the countermeasure can be drafted quickly.

The importance of the latest call is determined by using a weight set to each of the keywords extracted from the latest call. Thus, an importance of a call including an important keyword leading to a serial accident or failure or a negative keyword is determined to be high, so that the serial accident or failure, recall, and the like can be prevented. Furthermore, the weight is set in accordance with an input from the user, whereby the content of the analysis can be tuned for appropriately determining the importance.

The product information database 14 includes a plurality of sets of questions and answers related to products, and a question and an answer according to a plurality of keywords extracted from a call are selected. Thus, with the selected content presented to the client 100, the question from the client 100 in the call can be appropriately answered. The answer may be made by an operator in the contact center 101, or a sound guidance device (not illustrated) in the contact center 101 may automatically make the answer in a call with the client 100.

<2. Operation>

Figure 2:
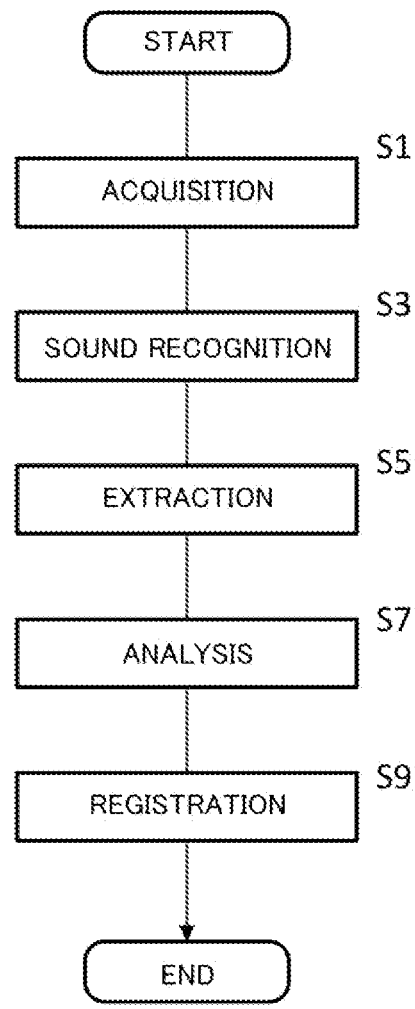
FIG. 2 illustrates an operation of the system 1.

FIG. 2 illustrates an operation of the system 1. The system 1 assists the support for the client 100 by executing processing in steps S1 to S9. The processing in steps S1 to S9 may be repeatedly executed each time call is made.

In step S1, the acquisition unit 10 acquires call data which is a record of a call between the client 100 and the contact center 101. The acquisition unit 10 may store the acquired call data in a storage server (not illustrated).

In step S3, the sound recognition unit 12 performs sound recognition on the call data by using a keyword registered in the dictionary data 11. In step S5, the extraction unit 13 extracts one or a plurality of keywords from text data included in a result of the sound recognition.

In step S7, the analysis unit 18 performs analysis by using the extracted keyword. The analysis unit 18 may supply a result of the analysis to any one of the client 100 and the user (for example, such as a manufacturer providing a product, the company operating the contact center 101, and the company operating the system 1). When the analysis result is supplied to the user, this analysis result may be displayed on a management screen (dashboard) that comprehensively displays the status of the client service, or may be stored in a Customer Relationship Management (CRM) database (not illustrated).

In step S9, the registration unit 16 registers in the dictionary data 11, a keyword included in the product information database 14 or the contract information database 15, among a plurality of keywords included in the result of the sound recognition. For example, the registration unit 16 detects as a registration candidate, a keyword included in the product information database 14 or the contract information database 15 from a plurality of keywords included in the result of the sound recognition. The registration unit 16 may additionally register in the dictionary data 11, a keyword that has not been registered in the dictionary data 11 among the registration candidate keywords. Thus, accuracy of the analysis performed in step S7 can be improved for the next time.

<3. Example of Analysis Result>

Figure 3:
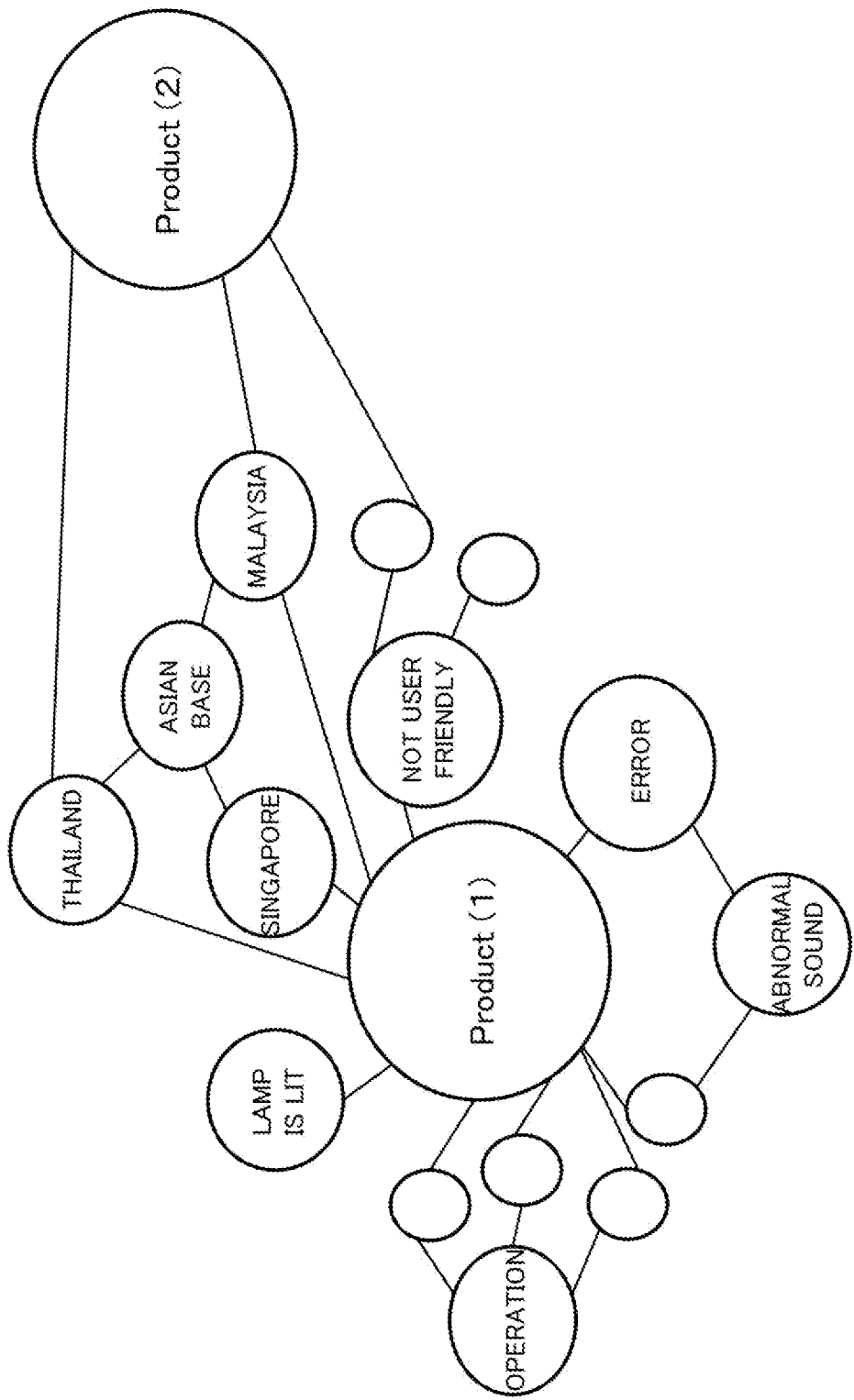
FIG. 3 illustrates an example of an analysis result output by an aggregation unit 180.

FIG. 3 illustrates an example of the analysis result output from the aggregation unit 180. The figure illustrates a graph (network structure) of a result of aggregating combinations each including two keywords contiguously extracted from each of the latest and past call data pieces. Each node in the figure represents a keyword (for example "Product (1)" and "Singapore"), and a keyword that occurs more frequently is illustrated to be larger. An edge in the figure represents a co-occurrence relationship. The edge may be illustrated to be thicker for stronger co-occurrence relationship, that is, a higher frequency of co-occurrence.

According to this figure, association among keywords occurred in the calls can be recognized at a glance. For example, it can be recognized that the product (1) produces abnormal noise under abnormality, is not user friendly, and is used in Thailand, Singapore, and Malesia. By using such an analysis result, the product (1) can be improved so that the product (1) can be prevented from causing an accident or failing. Furthermore, the product (1) can be improved in terms of its use in South-East Asian regions. Furthermore, it can be recognized that a product (2) does not produce abnormal sound. By using such an analysis result, a countermeasure can be quickly drafted when a new analysis result indicating that the abnormal sound is produced is output.

<4. Modification>

While the system 1 is described to include the dictionary data 11, the extraction unit 13, the product information database 14, the contract information database 15, and the weight setting unit 17 in the embodiment described above, the system 1 may not include at least one of these. For example, at least one of the dictionary data 11, the product information database 14, and the contract information database 15 may be externally connected to the system 1. When the system 1 does not include the extraction unit 13, the analysis unit 18 may perform the analysis by using a keyword included in a result of the sound recognition performed by the sound recognition unit 12.

Various embodiments of the present invention may be described with reference to a flowchart and a block diagram. In this context, a block may represent (1) a stage of a process in which an operation is executed or (2) a section of a device in charge of executing the operation. A predetermined stage and section may be implemented by at least one of a dedicated circuit, a programmable circuit supplied together with a computer readable command stored on a computer readable medium, and a processor provided together with a computer readable command stored on a computer readable medium. The dedicated circuit may include at least one of digital and analog hardware circuits, and may include at least one of an integrated circuit (IC) and a discrete circuit. The programmable circuit may include a reconfigurable hardware circuit including: a logical operation such as logical AND, logical OR, logical XOR, logical NAND, and logical NOR; a memory element such as a flipflop, register, field programmable gate array (FPGA), and a programmable logic array (PLA); and the like.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 4:
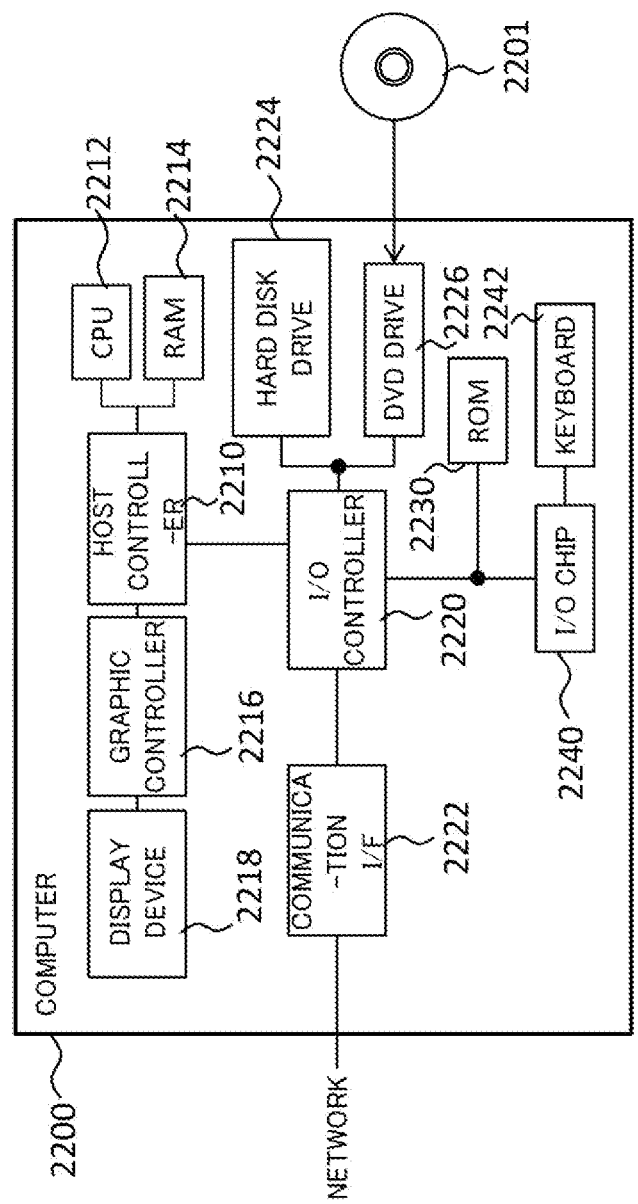
FIG. 4 illustrates an example of a computer 2200 in which a plurality of aspects of the present invention may be entirely or partially embodied.

FIG. 4 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

The present invention is described using the embodiment, but the technical scope of the present invention is not limited to the scope in the embodiment described above. It should be clear to a person skilled in the art that the embodiment described above is susceptible to various modifications or improvements. It should also be clear from the scope of the claims that forms having such modifications or improvements can be included in the technical scope of the present invention.

The order of each processing in the operations, procedures, steps, stages, and the like of the devices, systems, programs, and methods in the scope of the claims, specification, and drawings is not specifically disclosed using "beforehand", "in advance", and the like, and any order is possible as long as subsequent processing does not use an output from preceding processing. Even if "first", "next", and the like are used for convenience in describing the flow of operations in the scope of the claims, specification, and drawings, it is not meant that the operations need to be executed in this order.

REFERENCE SIGNS LIST

1 System
10 Acquisition unit
11 Dictionary data
12 Sound recognition unit
13 Extraction unit
14 Product information database
15 Contract information database
16 Registration unit
17 Weight setting unit
18 Analysis unit
100 Client
101 Contact center
180 Aggregation unit
181 Deviation calculation unit
182 Abnormality prediction unit
183 Importance determination unit
184 Selection unit
2200 Computer
2201 DVD-ROM
2210 Host controller
2212 CPU
2214 RAM
2216 Graphic controller
2218 Display device
2220 Input/output controller
2222 Communication interface
2224 Hard disk drive
2226 DVD-ROM drive
2230 ROM
2240 Input/output chip
2242 Keyboard

What is claimed is:

1. A system comprising:
an acquisition unit that acquires call data which is a record of a call between a client and a contact center;
a sound recognition unit that performs sound recognition on the call data by using
a keyword registered in dictionary data;
an analysis unit that performs analysis using a keyword included in a result of the sound recognition; and
a registration unit that registers in the dictionary data, a keyword included in a product information database among a plurality of keywords included in the result of the sound recognition, the product information database storing product information about each of a plurality of products,
wherein
under a condition that a keyword that has occurred in a plurality of the calls at a frequency or a number of times that is equal to, or higher or larger than a criterion is included in the product information database, the registration unit registers the keyword in the dictionary data; and
the analysis unit includes an abnormality prediction unit that predicts a type of product abnormality related to a latest call, by using a result of comparison between a combination of a first plurality of the keywords obtained by the sound recognition on the call data about the latest call and a combination of a second plurality of the keywords aggregated, for each type of product abnormality, from a plurality of past calls.

2. The system according to claim 1, wherein the analysis unit includes a deviation calculation unit that calculates a deviation of a combination of a first plurality of the keywords obtained by the sound recognition on the call data about a latest call, based on a result of comparison between the combination of the first plurality of keywords and a combination of a second plurality of the keywords aggregated from a plurality of past calls.

3. The system according to claim 1 further comprising a weight setting unit that sets a weight to a keyword registered in the dictionary data, in accordance with an input from a user, wherein
the analysis unit includes an importance determination unit that determines importance of a latest call, using the weight set to each of a first plurality of the keywords obtained by the sound recognition on the call data about the latest call.

4. The system according to claim 1, wherein
the product information database includes a plurality of sets of questions and answers related to the products, and
the analysis unit includes a selection unit that selects a question and an answer according to a plurality of the keywords obtained by the sound recognition, from the plurality of sets of questions and answers.

5. The system according to claim 1, wherein the registration unit registers in the dictionary data, a keyword included in a contract information database among the plurality of keywords, the contract information database storing information about a service contract signed with each client.

6. A method comprising:
acquiring call data about a call which is a record of a call between a client and a contact center;
performing sound recognition on the call data by using a keyword registered in dictionary data;
performing analysis using a keyword included in a result of the sound recognition; and
registering in the dictionary data, a keyword included in a product information database among a plurality of keywords included in the result of the sound recognition, the product information database storing product information about each of a plurality of products,
wherein
under a condition that a keyword that has occurred in a plurality of the calls at a frequency or a number of times that is equal to, or higher or larger than a criterion is included in the product information database, the keyword is registered in the dictionary data; and
the performing the analysis includes performing an abnormality prediction to predict a type of product abnormality related to a latest call, by using a result of comparison between a combination of a first plurality of the keywords obtained by the sound recognition on the call data about the latest call and a combination of a second plurality of the keywords aggregated, for each type of product abnormality, from a plurality of past calls.

7. A non-transitory computer-readable medium having a program recorded thereon, the program causing a computer to function as:
an acquisition unit that acquires call data which is a record of a call between a client and a contact center;
a sound recognition unit that performs sound recognition on the call data by using a keyword registered in dictionary data;
an analysis unit that performs analysis using a keyword included in a result of the sound recognition; and
a registration unit that registers in the dictionary data, a keyword included in a product information database among a plurality of keywords included in the result of the sound recognition, the product information database storing product information about each of a plurality of products,
wherein
under a condition that a keyword that has occurred in a plurality of the calls at a frequency or a number of times that is equal to, or higher or larger than a criterion is included in the product information database, the registration unit registers the keyword in the dictionary data; and
the analysis unit includes an abnormality prediction unit that predicts a type of product abnormality related to a latest call, by using a result of comparison between a combination of a first plurality of the keywords obtained by the sound recognition on the call data about the latest call and a combination of a second plurality of the keywords aggregated, for each type of product abnormality, from a plurality of past calls.

* * * * *